Patented Oct. 17, 1933

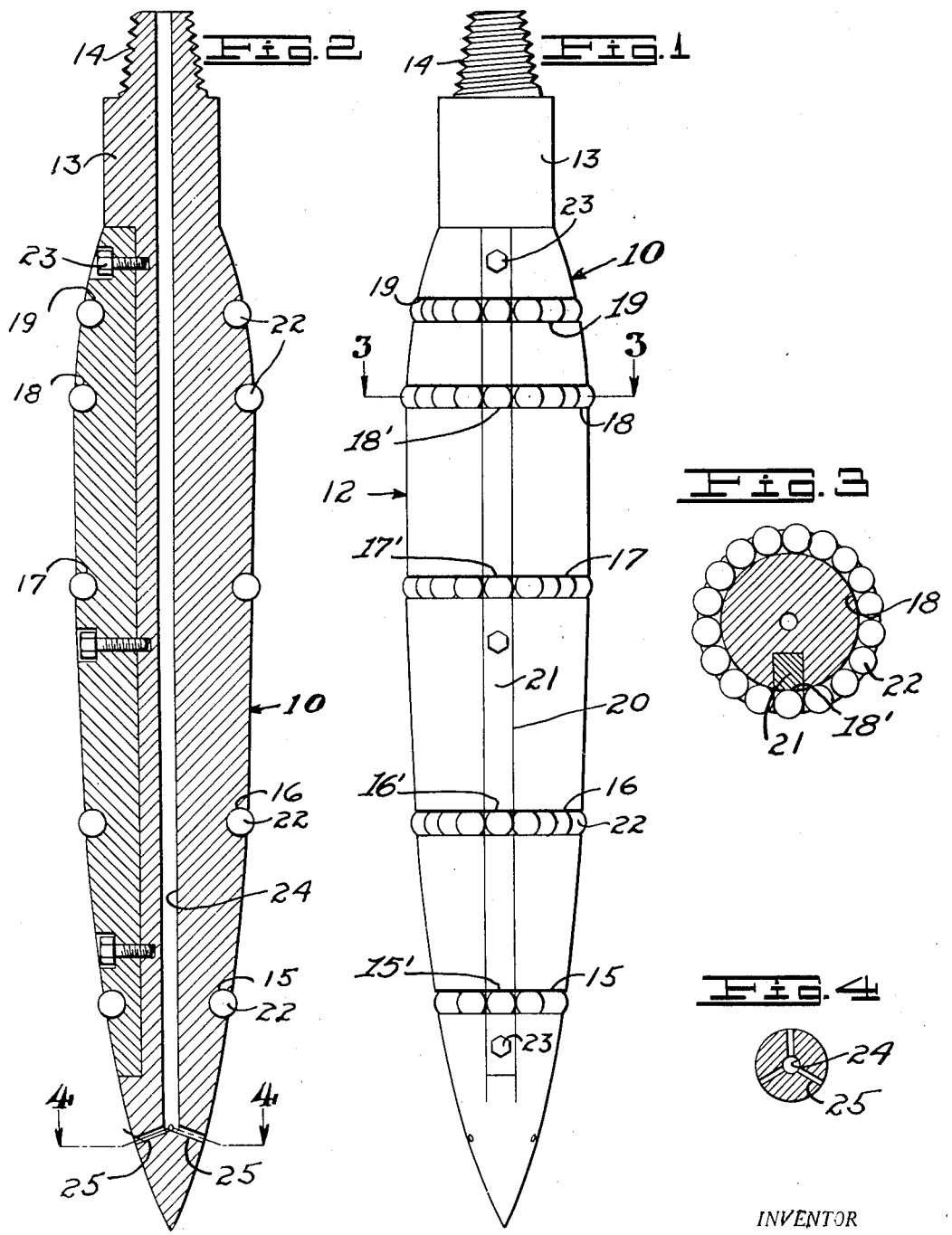

1,930,825

UNITED STATES PATENT OFFICE 1,930,825

COMBINATION SWEDGE

Edward F. Raymond, Long Beach, Calif.

Application April 28, 1932. Serial No. 608,117

4 Claims. (Cl. 153—81)

This invention relates to improvements in combination swedges.

The general object of this invention is to provide an improved swedging tool for reforming collapsed pipe and more particularly for use in reforming collapsed oil and gas, or other well, casing.

Another object of the invention is to provide a swedging tool including means whereby it will reform a pipe which has collapsed at a point above the swedging tool when the tool is operating in a well.

Other objects and the advantage of this invention will be apparent from the following description taken in connection with the accompanying drawing wherein:

Fig. 1 is a side elevation of my improved swedging tool.

Fig. 2 is a central longitudinal section through the swedging tool.

Fig. 3 is a section taken on a line 3—3 of Fig. 1.

Fig. 4 is a section taken on line 4—4 of Fig. 2.

Referring to the drawing by reference characters, I have indicated my improved swedging tool generally at 10. As shown the device 10 comprises a cigar shaped body portion 12 having at one end thereof a reduced neck 13 on which a reduced threaded boss 14 is provided.

The body 12 is annular in cross section and longitudinally tapers outwardly from the outers of the neck 13 to a predetermined diameter and then tapers inwardly and terminates in a point at the end opposite the neck 13.

Intermediate the length of the body 12 I provide a plurality of circumferential grooves which are shown as five in number and are indicated at 15, 16, 17, 18 and 19. These grooves are all of the same depth thereby causing the groove 18 to have the greatest diameter, the grooves 17 and 19 having less diameter than the groove 18, the groove 16 less diameter than the groove 17 and the groove 15 less diameter than the groove 16.

Extending longitudinally of the body 12, I provide a recess 20 which extends from a point above the groove 19 to a point below the groove 15. Positioned in the recesses 20, I provide a bar 21 which includes transverse grooves 15', 16', 17', 18' and 19' respectively. Positioned in the grooves 15, 16, 17, 18 and 19 and their associated grooves 15', 16', 17', 18' and 19', I provide a plurality of ball members 22. All the ball grooves are arcuate in cross section and are undercut sufficiently to retain the balls 21 therein.

When positioning the balls 22 in their respective grooves 15, 16, 17, 18 and 19 the bar 21 is removed from the recess 20, the required number of balls placed in the grooves 15, 16, 17, 18 and 19, a single ball placed in each transverse groove of the bar 21 and then the bar 21 is replaced in the recess 20. The bar 21 may be secured in position in any desired manner such as by bolts 23. Extending through the device from the upper end of the threaded bars 14 to adjacent the pointed end of the body, I provide a circulation recess 24 from the bottom of which a plurality of angularly positioned reduced apertures 25 extend to the outer face of the body.

When it is desired to reform a collapsed portion of oil well casing the swedging tool 10 is secured to the lower end of a string of drill tubing and the tubing lowered until the balls in the lower groove 15 engage the collapsed sides of the casing, whereupon, the tubing is rotated thereby rotating the swedging tool 10. As the device 10 is thus rotated the balls in the groove 15 in coaction with the weight of the drill tubing force the collapsed casing wall outward until it is of sufficient internal diameter to allow the balls in the groove 15 to move downward. As the device 10 continues to travel downward the balls in the groove 16 engage the partly reformed side walls of the collapsed section of casing and force it outwardly until it is of a sufficient internal diameter to allow the balls in the groove 16 to move downward. The balls in the grooves 17 and 18 perform the same function as the device continues to move downward.

When the balls in the groove 18 are free to move longitudinally in the previously collapsed section of the well casing, the collapsed section has been reformed to its original diameter. Should the well casing collapse at a point above the device 10 while it is in the well, the operator raises the drill pipe until the balls in the groove 19 engages the side walls of the collapsed section and rotates the drill pipe and the device 10 and at the same time retains a constant upward pull on the drill pipe thereby retaining the balls in the groove 19 in tight engagement with the collapsed side walls of the casing. As the device 10 is thus rotated and pulled upward the balls in the grooves 19 force the collapsed walls of the casing outward until they can move upward whereupon the balls in the groove 18 engage the partly reformed casing side walls and force them outwardly until the collapsed section of casing is reformed to its original diameter.

From the foregoing description it will be apparent that I have provided a novel swedging tool which is simple in construction and highly efficient in use.

Having thus described my invention, I claim:

1. In a swedging device, a cigar shaped body, having an annular groove therein, said body having a recess therein, a bar positioned in said recess, a groove in said bar in register with the groove in said body, means to secure said bar to said body, and a plurality of rotatable members in said groove of said body and in said transverse groove of said bar, said members extending beyond the periphery of said body.

2. In a swedging device, a body, said body including a head portion at one end having a reduced threaded hub thereon, said body being substantially cigar shaped a plurality of spaced annular grooves in said body portion, one of said grooves being arranged at the largest diameter of said body, and the others of said grooves being positioned at each side of said first mentioned groove there being a longitudinally extending recess in said body, a bar positioned in said recess and having a plurality of transverse grooves in register with the grooves in said body, means to secure said bar to said body, a plurality of rotatable members in each of said grooves of said body and in said transverse grooves of said bar, a portion of each of said rotatable members extending beyond the periphery of said body.

3. In a swedging device, a body, said body including a head portion at one end having a reduced thread hub thereon, said body being annular in cross section and longitudinally tapering outward from said head to a certain diameter and thereafter tapering inward and terminating in a point at the end opposite said head, there being a plurality of spaced annular grooves in said body portion, one of said grooves being at the largest diameter of said body, the other grooves being positioned intermediate said first mentioned groove and the ends of said body, a longitudinally extending recess in said body, a bar positioned in said recess, a plurality of transverse grooves in said bar in register with the grooves in said body, means to secure said bar to said body, a plurality of ball members in each of said grooves of said body and in said transverse grooves of said bar, a portion of each of said ball members extending beyond the periphery of said body.

4. In a swedging device, a tapering body portion having a plurality of annular grooves therein, said body having a longitudinal recess intersecting said grooves, a removable member positioned in said recess, said removable member having grooves in alignment with said first mentioned grooves, a plurality of rotatable members in said grooves, said rotatable members projecting beyond the surface of said body.

EDWARD F. RAYMOND.